United States Patent [19]
Dreyer

[11] 4,366,760
[45] Jan. 4, 1983

[54] SEED DRILL

[75] Inventor: Heinz Dreyer, Hasbergen-Gaste, Fed. Rep. of Germany

[73] Assignee: Amazonen-Werke, Hasbergen-Gaste, Fed. Rep. of Germany

[21] Appl. No.: 170,212

[22] Filed: Jul. 18, 1980

[30] Foreign Application Priority Data

Jul. 27, 1979 [DE] Fed. Rep. of Germany ....... 2930550

[51] Int. Cl.³ .............................................. A01C 5/06
[52] U.S. Cl. .................................... 111/85; 172/184; 172/574
[58] Field of Search ............... 172/574, 596, 166, 172, 172/175, 176, 184, 538, 603, 575, 576, 594, 672, 671, 669, 670, 671, 675; 111/85, 88

[56] References Cited

U.S. PATENT DOCUMENTS

| 245,258 | 8/1881 | Clarkson | 172/176 X |
| 1,046,872 | 12/1912 | Sessler | 172/574 X |
| 2,704,524 | 3/1955 | McIntyre | 172/574 |
| 2,765,756 | 10/1956 | Webster | 172/574 |
| 3,097,616 | 7/1963 | Arnold | 111/87 X |
| 3,675,725 | 7/1972 | Schultz | 172/669 |
| 3,705,560 | 12/1972 | Lappin | 172/484 |
| 4,117,788 | 10/1978 | Whitehead | 111/87 X |
| 4,275,670 | 6/1981 | Dreyer | 111/87 |

FOREIGN PATENT DOCUMENTS 2728006 1/1979 Fed. Rep. of Germany ........ 111/85

Primary Examiner—Richard J. Johnson

[57] ABSTRACT

A seed drill having single-disk furrow openers 6 set at an acute angle α to the direction of travel. The total number of furrow-opener disks is divisible by four, and one half of the furrow-opener disks in each transverse row are set at the acute angle (α) relative to the direction of travel which is directed to one side, and the half are set at an angle α which is directed to the other side.

3 Claims, 1 Drawing Figure

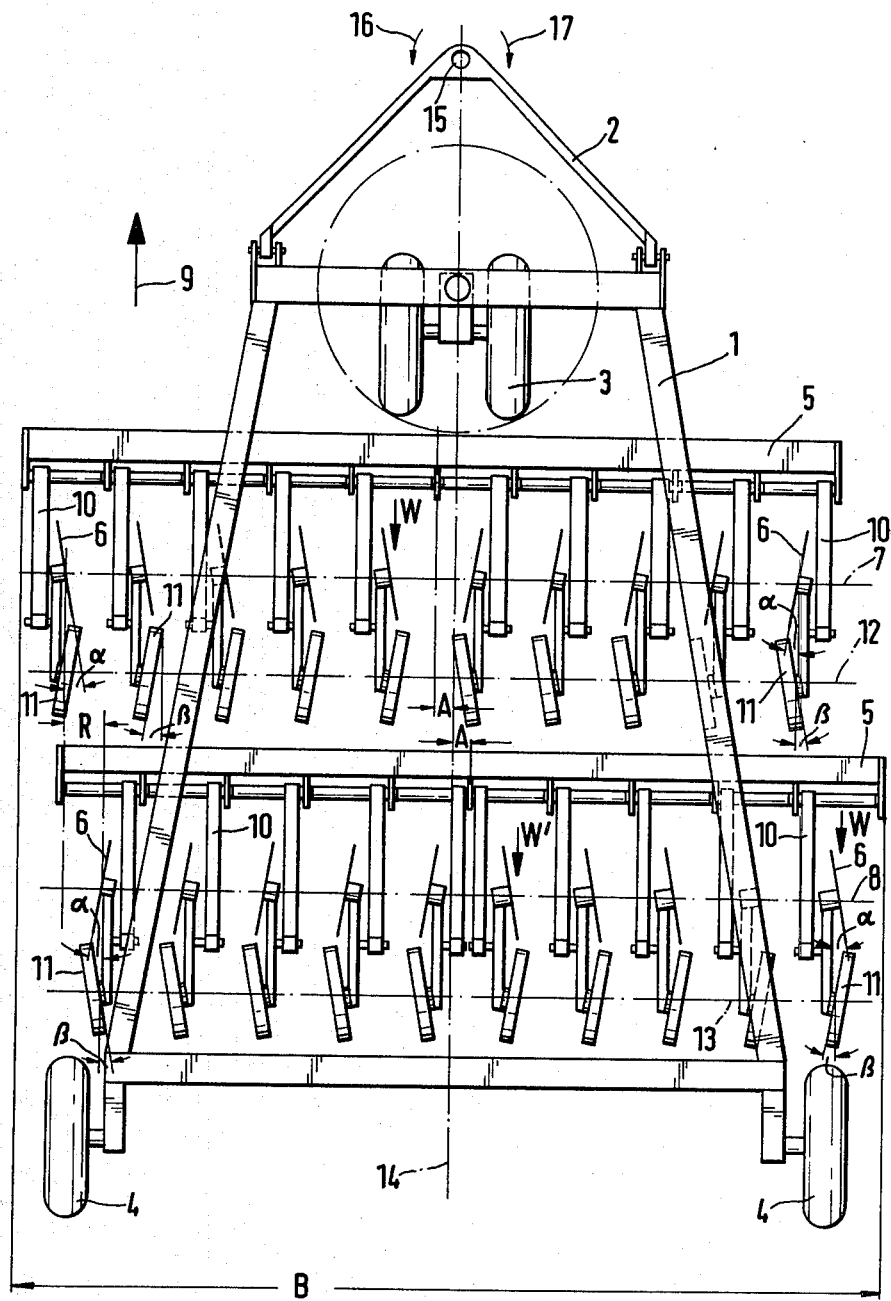

SEED DRILL

The invention relates to a seed drill having a frame on which single-disk furrow openers set at an acute angle to the direction of travel are arranged by means of mounts, for displacement in the vertical plane, in an alternating and staggered pattern in two rows disposed one behind the other.

A seed drill of this type is known from U.S. Pat. No. 3,705,560. In that drill, the angles at which the furrow openers are set relative to the direction of travel are all directed to one side.

This has the drawback that the lateral forces arising at each furrow-opener disk from the soil resistance as a function of the angle at which it is set are cumulative, with the result that the seed drill exhibits a tendency to assume in its operating position an attitude that is angled to a greater or lesser degree relative to the direction of travel and offset to one side relative to the tractor which tows the seed drill.

To counteract this tendency, the frame is placed on casters, each comprising two wheels, at least one of which is adapted to be locked in a position parallel to the direction of operation of the seed drill. Moreover, press wheels disposed in a transverse row to the rear of the furrow-opener disks are provided not only for the closing and firming of the seeded furrows but also to secure that the seed drill runs true behind the tractor towing it.

However, since the forces or resistance components acting laterally on the furrow-opener disks vary as a function of the prevailing soil conditions and of the traveling speeds used in operation, these lateral forces cannot be adequately neutralized. As a result, differences in the spacing of the rows in which the seed is to be deposited in the soil will arise especially between the individual working paths, and these will ultimately result in reduced crop yields.

This is a serious drawback particularly when the seed drill is used in direct seeding, in other words, in fields which after the previous crop have not been conventionally prepared for seeding by means of cultivating equipment, or when the seed drill is used on a hillside. Under such conditions, the performance of the seed drill will suffer further because of the plant residues left on the ground after the harvest, which will clog the narrow spaces between the press wheels disposed in a transverse row.

Regardless of the way in which the seed drill is being used, the one-sided setting of the furrow-opener disks results in just as one-sided and undesirable displacement of the soil caught by the disks.

The invention has as its object to secure satisfactory, troublefree operation of the seed drill and the adequate equalization which it requires of the lateral forces arising at the individual furrow-opener disks so that these forces will have no effect on the operation of the seed drill.

In accordance with the invention, this object is accomplished by selecting a total number of furrow-opener disks that is divisible by four, and by setting one half of the furrow-opener disks present in each transverse row at an acute angle relative to the direction of travel that is directed to one side, and the other half at such an angle that is directed to the other side. By this expedient, the desired equalization is secured not only overall but also for each transverse row of furrow-opener disks. This is of importance especially when, as in the prior-art seed drill, the furrow-opener disks are alternately mounted on two crossbeams which are disposed one behind the other and fastened to the frame, since in that case bending moments acting on the crossbeams from one side are likewise suppressed. Such bending moments arise when the angles at which the furrow-opener disks of the forward transverse row are set extend to one side, and those of the rear transverse row to the other side, of the direction of travel.

Moreover, in accordance with the invention the furrow-opener disks in the two halves of the rear transverse row are set at angles relative to the direction of travel which are directed oppositely to those of the furrow-opener disks in the two halves of the forward transverse row disposed in front of them. As a result of these measures, the lateral forces in the two transverse rows cancel each other out. A further advantage is that soil moved aside by the furrow-opener disks of the forward transverse row in cutting the seed furrows is moved in the opposite direction by the furrow-opener disks of the rear transverse row, so that soil will accumulate neither in the center of the working width of the seed drill nor along the margins.

If the seed drill is to be used in direct seeding, it is particularly advantageous when, in accordance with the invention, the furrow-opener disks of the two halves of the forward transverse row are set at an angle relative to the direction of travel which is directed inwardly, and those of the two halves of the rear transverse row at an angle which is directed outwardly. The reason for this is that in this application the furrow-opener disks of the forward transverse row penetrate completely untilled soil whereas the furrow-opener disks of the rear transverse row, though staggered, act on soil already precut by the forward disks. The rear disks therefore encounter somewhat less soil resistance than the forward disks.

In connection with the requisite lateral offset by one row spacing between the transverse rows, the forward furrow-opener disks will produce at the towing means disposed at the center of the frame of the seed drill a torsional moment acting in one lateral direction that is somewhat greater than the torque generated by the rear disks and acting in the opposite direction. However, as a result of the above measures, the torque produced by the rear furrow-opener disks is slightly increased by the outer rear furrow-opener disk which is located to the side of the zone of action of the forward disks and therefore cuts completely untilled soil, so that on balance the torque produced by the forward furrow-opener disks is just slightly greater.

Now if as a further refinement of the invention the furrow-opener disks of the rear transverse row are offset to the right with respect to those of the forward transverse row, then the forward transverse row of disks will produce a torque in a counterclockwise direction, and the rear transverse row of disks a torque in a clockwise direction, as will be explained in greater detail further on in connection with the description of an embodiment, with the counterclockwise torque slightly preponderating. In this way, allowance is made for the fact that nearly everybody has a tendency to deviate toward the left when trying to go straight ahead, and therefore prefers a left turn to a right turn. It is for this reason that in countries where fields are cultivated in a circular pattern, this is done in a counterclockwise direction, which is facilitated by the above measures.

Finally, in a preferred embodiment of this seed drill, in which press wheels are disposed to the rear of the single-disk furrow openers, these press wheels are likewise arranged in two transverse rows, one behind the other, each press wheel being mounted on a furrow-opener disk mount, and forming an angle with the direction of travel that is oppositely directed to the angle at which the furrow-opener disk ahead of it is set. In this way, the lateral forces acting on the furrow-opener disks on the one hand and the press wheels on the other hand are largely balanced out with respect to each individual mount. Moreover, in this embodiment the individual press wheels are spaced twice as far apart as in the prior-art seed drill described above, and the press wheels therefore will not jam even in the presence of an abundance of plant residues. In addition, the performance of the press wheels here is substantially improved in that they catch the soil which is moved to one side by the furrow-opener disks as the furrows are cut and force it back into the seeded furrow.

The invention will now be described in greater detail with reference to the accompanying drawing, which is a plan view of the disposition of the single-disk furrow openers in a seed drill in accordance with the invention.

The seed drill comprises a frame 1 at whose forward center a towing means 2 is located and which in the front is supported on the ground through the freely swiveling two-wheel caster 3 and in the back through the two wheels 4. The frame 1 further carries the two crossbeams 5, one behind the other, on which a total of 20 furrow-opener disks 6 are alternately mounted in two transverse rows 7 and 8, offset relative to one another in the direction of travel 9, and displaceable in the vertical plane by means of the mounts 10. The individual furrow-opener disks 6 are laterally spaced apart by the distance R, which corresponds to the spacing of the rows in which the seed is to be deposited and by which the disks 6 of the rear transverse row 8 are offset to the right relative to those of the forward transverse row 7. With an overall width B of three meters corresponding to the working width of the seed drill, this arrangement results in a row spacing of 15 cm, as generally preferred in the planting of grain crops. Now since agricultural machines of such width are permitted on public highways and roads, this seed drill, unlike the prior-art drill described earlier, requires no changeover for road transport, nor must it be carried on a long-haul transporter.

All furrow-opener disks 6 are set at the same angle to the direction of travel 9. The five left-hand and the five right-hand furrow-opener disks 6 of the forward transverse row 7 are set at angles $\alpha$ that are directed inwardly, and the five left-hand and five right-hand disks 6 of the rear transverse row are set at angles $\alpha$ which are directed outwardly, with respect to the direction of travel 9. The furrow-opener disks 6 in succeeding halves of the forward and rear transverse rows 8 therefore necessarily run in opposite directions.

Rotatably mounted on the same mount 10 in back of each furrow-opener disk 6 is a press wheel 11, the press wheels thus being likewise arranged in two transverse rows 12 and 13, one behind the other.

Because of the lateral offset to the right by one row spacing R of the furrow-opener disks 6 of the rear transverse row 8 relative to those of the forward transverse row 7, and hence of the two crossbeams 5 relative to each other, the centers of the crossbeams 5 are spaced by the lateral distance A, which corresponds to one-half the row spacing R, from the centerline 14 drawn through the frame 1 in the direction of travel 9. The center of the forward crossbeam 5 is spaced from the centerline 14 by the distance A to the left, and the center of the rear crossbeam 5 by the distance A to the right.

Because of the soil resistance W, W' acting on the individual furrow-opener disks 6, there are generated at the towing eye 15 of the towing means 2 a counterclockwise torque 16, due to the forward crossbeam 5, and a clockwise torque 17, due to the rear crossbeam 5. The torque 16 is somewhat greater than the torque 17 since the soil resistance W encountered by the forward furrow-opener disks 6 is slightly higher than the soil resistance W' acting on the rear disks 6. However, this slight difference between the torques 16 and 17 is nearly balanced out in that the right rear furrow-opener disk 6, which like the forward disks must cut a wholly untilled compact soil, is likewise exposed to the higher soil resistance W. There nevertheless remains a very slight preponderance of the torque 16, which imparts to the seed drill a very mild tendency to deviate from the straight line of travel to the left, and this results in the advantage described earlier.

It will be appreciated that the instant specification and claims are set forth by way of illustration and not of limitation, and that various changes and modifications may be made without departing from the spirit and scope of the present invention.

I claim:

1. In a seed drill moveable along a direction of travel and having a frame, a plurality of furrow opener disks, means rotatably mounting the furrow opener disks on the frame in two transverse rows disposed one behind the other with the disks alternating and staggered relative to each other and with each disk displaceable vertically relative to the frame and the disks of each row slanted at an acute angle to the direction of travel, the improvement wherein: the total number of disks is divisible by four; one half of the disks in each row are disposed at said acute angle towards one side and the other half of the disks in each row are disposed at said acute angle towards the other side; the rear transverse row is offset to the right with respect to the front row when viewed from the rear of the seed drill; press wheels mounted on the mounting means and disposed in back of the furrow opener disks, wherein the press wheels are disposed in two transverse rows, one behind the other, with each press wheel set at an angle to the direction of travel which is directed oppositely to the angle at which the furrow opener disk in front of it is set.

2. The seed drill according to claim 1, wherein the disks of each half of each transverse row is slanted in the same direction and wherein the disks of the front transverse row slant outwardly relative to the direction of travel and the disks of the rear transverse row slant inwardly relative to the direction of travel.

3. The seed drill according to claim 1 or 2, wherein ten furrow opener disks are disposed in each transverse row.

* * * * *